J. F. & V. S. DURBIN.
CAR COUPLING.
APPLICATION FILED JUNE 25, 1908.
943,144.
Patented Dec. 14, 1909.
2 SHEETS—SHEET 2.
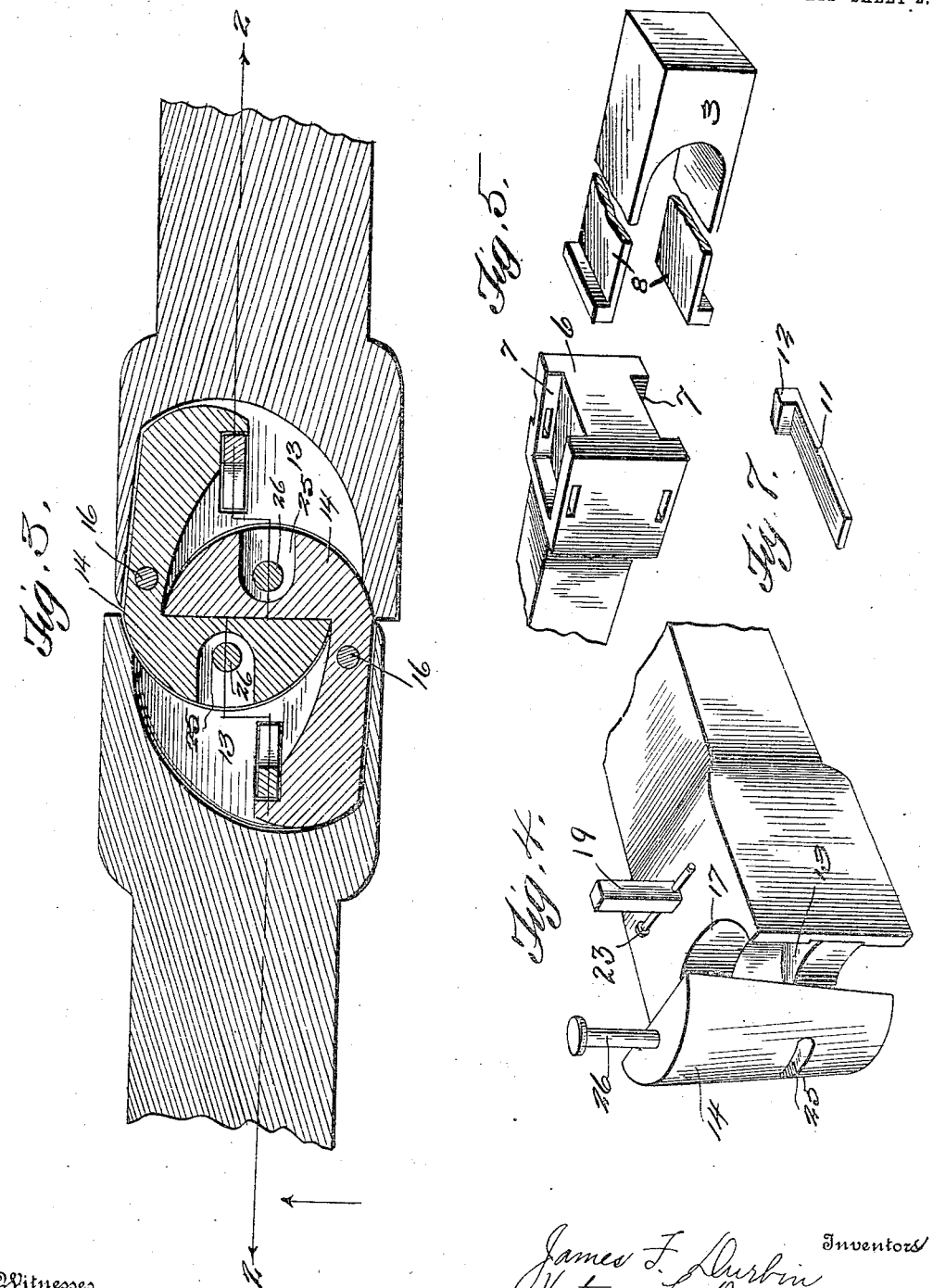

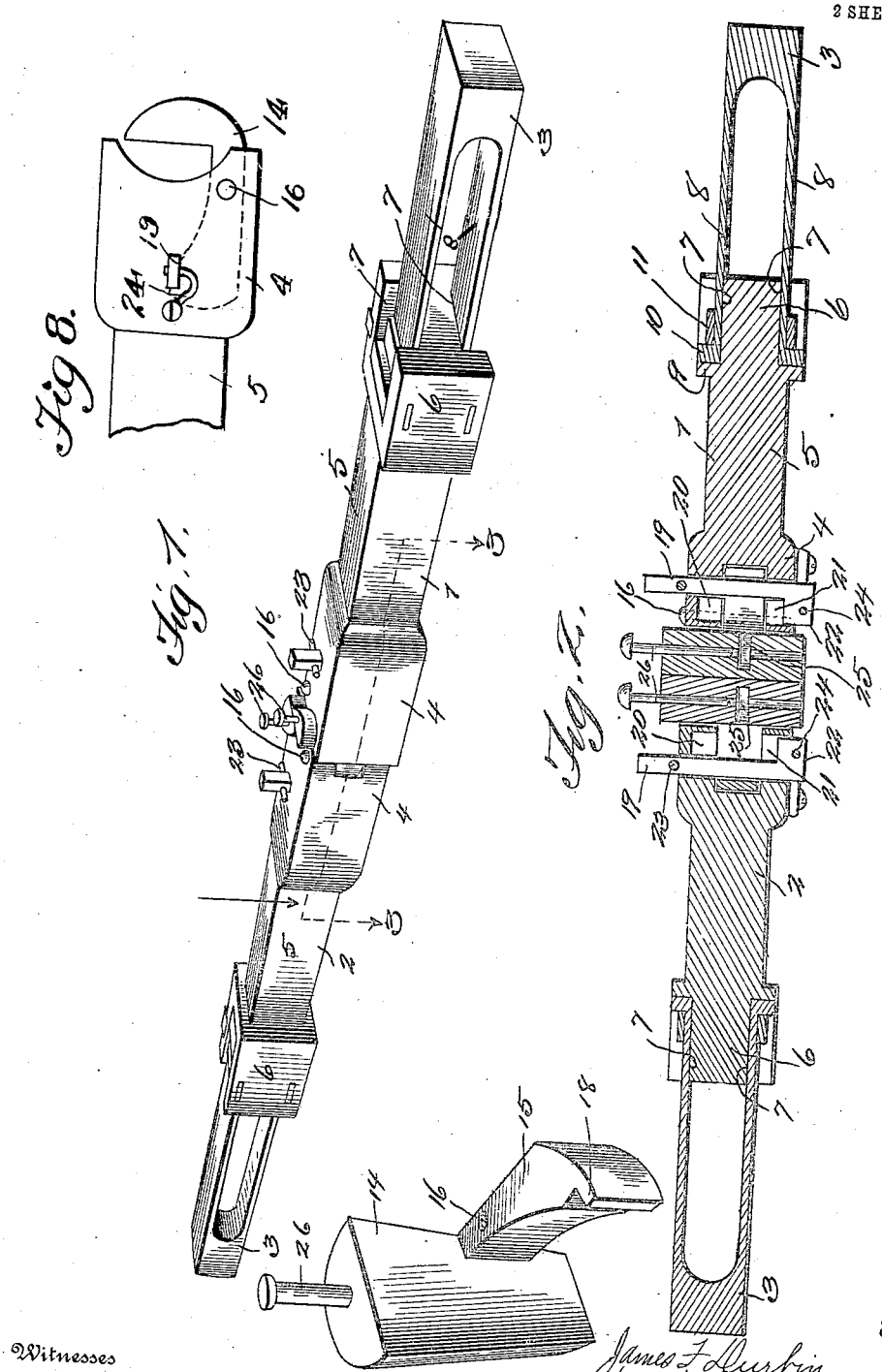

UNITED STATES PATENT OFFICE.

JAMES F. DURBIN AND VOTAW S. DURBIN, OF FORT SCOTT, KANSAS.

CAR-COUPLING.

943,144.

Specification of Letters Patent. Patented Dec. 14, 1909.

Application filed June 25, 1908. Serial No. 440,247.

*To all whom it may concern:*

Be it known that we, JAMES F. DURBIN and VOTAW S. DURBIN, citizens of the United States, residing at Fort Scott, in the county of Bourbon and State of Kansas, have invented certain new and useful Improvements in Car-Couplings, of which the following is a specification.

This invention relates to new and useful improvements in car coupling means and it aims as a primary object to provide a car coupler in which danger of derailment due to loose lateral or vertical play will be obviated and in which novel means are provided for connecting the coupling members with the ends of the draw bar for the purposes of removing or renewing parts.

The invention resides more particularly in novel structural details embodied in coöperating pivoted knuckles which engage in interlocked relation and in the means for holding said knuckles in such interlocked relation.

The above and other objects will appear in the course of the following description in which reference is had to the accompanying drawings forming a part of this specification, like characters of reference designating similar parts throughout the several views, wherein:

Figure 1, is a detailed perspective view of coöperating coupling parts constructed in accordance with the present invention. Fig. 2, is a longitudinal sectional view of such coupling parts on the line 2—2 of Fig. 3. Fig. 3, is a horizontal sectional view of said parts on the line 3—3 of Fig. 1. Fig. 4 is an enlarged detail perspective view showing the end construction of one of the coupling parts, the other part complementary thereto being a counterpart in construction. Fig. 5 is a detailed perspective view showing in detached relation the end formations of a coupling part and the draw bar member connected to said part. Fig. 6, is a detailed perspective view of a locking knuckle embodied as a component part of the invention. Fig. 7 is a detailed perspective view of one of the keys employed to join the coupling part and draw bar member. Fig. 8 is a bottom view of one of the coupling heads, showing the means for securing the locking pins.

The coupling parts are designated 1 and 2, and the draw bar members 3. The parts 1 and 2 are similarly constructed and complement one another in interfitting relation in which relation they are held locked by means to be hereinafter described. Hence, it will be understood that a description of one coupling part is equally as applicable to both. Each coupling part comprises a head portion 4 and a shank portion 5 which latter has at its end an enlargement 6, formed with grooves 7 in two opposite faces. The grooves 7 serve as seats to receive and hold the ends of bifurcations 8 provided on each member 3, the bifurcations 8 bearing against shoulders 9, forming the end walls of the grooves 7. Said bifurcations are in turn formed at their ends with outwardly extending shoulders 10 which are confined between the said shoulders 9 and transverse locking keys 11, removably inserted through openings in the side walls of the grooves 7. One of the keys 11 is illustrated more particularly in Fig. 7. Said keys each have an enlarged stop head 12, one of the openings through which the keys are inserted being countersunk to receive the said stop head. The head portions 4 are formed with recesses 13, opening to the ends thereof. The locking of the parts 1 and 2 is effected primarily by knuckles 14, having angularly extending shanks 15 which work and are confined in the recesses 13 by means of pivot pins 16 which pass through said shanks 15 at a point adjacent the junction thereof with the knuckles 14. The latter have flat contacting faces and curved faces and are of tapering form, so that their general shape may be described as that of a half segment of a conical frustum. The head portions 4 are formed in their end faces with curved recesses 17 which extend at a right angle to the recesses 13 and which are shaped conformably to, and serve as seats to receive, the knuckles 14, when the latter are engaged with one another as shown more particularly in Fig. 3. In such relation said knuckles, by virtue of their general hook shape engage rearwardly of one another, their flat faces contacting as above intimated.

The shanks 15 are formed at their ends with extended shoulders 18, with which coöperate vertical locking pins 19, which are slidable through recesses 20 and 21, constructed as extensions of the recesses 13, the pins 19 being flat sided so as to be non-rotatable. The recesses 20 are countersunk to receive stop lugs 22 formed on the ends of the pins 19, to limit the outward movement of the latter, the inward movement of said pins being limited by cotter pins 23 which are engaged through the pins 19 and which bear against the adjacent outer faces of the head portions 4. When the pins 19, have been moved inwardly and the knuckles 14 engaged in the manner above set forth, said pins bear against the shoulders 18 to prevent pivotal movement of the shanks and consequently to lock the knuckles in their engaged relation. The pins 19 are held against displacement from their active positions by removable hooks 24 carried on the under faces of the head portions 4 and which are engaged through the lugs 22 and which appear in section in Fig. 2.

The knuckles 14 are provided in their curved faces with recesses 25 to receive links (not shown) which may be used as coupling elements in emergency cases, such as derailment, which links are held in said recesses by headed locking pins 26 movable axially of said knuckles.

In use, the pins 19 serve to effectually lock the knuckles 14 against axial displacement from their interlocked relation and vertical displacement is effectually prevented by the tapering contour of said knuckles which upon undue vertical play of the parts in either direction have a wedging action against the curved tapering faces of the recesses 17.

The manner of connecting the coupling parts to the draw bar members permits of the ready renewal and replacement of broken or worn parts and also of making other repairs which may be found necessary with but a slight expenditure of time and labor.

The manner of holding the pins 19 by the cotter pins 23 and the hooks 24 assures of said pins 19 being held actively assembled under all conditions and consequently accidental disjointment of the coupled parts is impossible.

Having fully described our invention, we claim:—

1. In combination, opposing coupling parts each having a head portion formed with a recess extending to its end face and formed with a second tapered recess in its end face, a locking knuckle in each head portion having a reduced shank pivoted and working in said first named recess, said knuckles engaging conformably in the tapered recess of the opposed coupling part, said shanks having extended shoulders at their inner ends, a locking pin engaged through each head portion and constructed to engage said shoulders and thereby prevent pivotal movement of said shanks and means for holding said pins against displacement.

2. In combination two similarly constructed complementary coupling parts, each having a head portion formed with a recess extending to its end face and formed with a second recess in its end face, a locking knuckle having a reduced shank pivoted and working in said first named recess, and means detachably engaging the shank to hold the same against pivotal movement in the locked relation of the knuckles, said knuckles having curved tapering faces and engaging in said second named recesses, the latter having their faces curved and tapering conformably to the faces of said knuckles seating therein.

3. A car coupling comprising in combination opposing members, each comprising a head, a locking knuckle pivoted to said head, said knuckle having a rear vertical straight face and a front tapered face, and means to lock the knuckles of said opposing heads with their straight faces in engagement.

4. A car coupling, comprising in combination, opposing members, each comprising a head, a tapered knuckle pivoted to said head, means for engaging the knuckles of said opposing members, and means for locking said knuckles in engagement.

5. A car coupling comprising in combination, opposing members, each comprising a head, a tapered knuckle pivoted to said head, each of said knuckles having a face adapted to engage the face of the opposing knuckle, and each of said heads having a conformation adapting it to coöperate with said tapered knuckle to prevent vertical movement of said knuckles, and means for locking said knuckles in engagement.

In testimony whereof we affix our signatures, in presence of two witnesses.

JAMES F. DURBIN.
VOTAW S. DURBIN.

Witnesses:
KATIE HUNKER,
ROSS KITZMILLER.